US008547581B2

(12) United States Patent
Igarashi et al.

(10) Patent No.: US 8,547,581 B2
(45) Date of Patent: Oct. 1, 2013

(54) PRINTING SYSTEM, PRINTING APPARATUS, PRINTING METHOD, AND STORAGE MEDIUM

(75) Inventors: Masaaki Igarashi, Saitama (JP); Hiroshi Gotoh, Tokyo (JP); Takeshi Yoshizumi, Tokyo (JP); Hozumi Yonezawa, Tokyo (JP); Takahiro Hirakawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 309 days.

(21) Appl. No.: 12/955,172

(22) Filed: Nov. 29, 2010

(65) Prior Publication Data
US 2011/0128579 A1 Jun. 2, 2011

(30) Foreign Application Priority Data
Dec. 2, 2009 (JP) ................................. 2009-274496

(51) Int. Cl.
*G06F 3/12* (2006.01)

(52) U.S. Cl.
USPC ....... 358/1.15; 358/1.13; 358/1.14; 358/1.16; 711/111; 707/736

(58) Field of Classification Search
None
See application file for complete search history.

(56) References Cited

U.S. PATENT DOCUMENTS

| 6,353,484 B1* | 3/2002 | Takashima ................... 358/1.15 |
| 7,158,243 B2* | 1/2007 | Sakamoto et al. ............. 358/1.1 |
| 7,242,488 B2* | 7/2007 | Matsueda .................... 358/1.14 |
| 7,595,907 B2* | 9/2009 | Carney et al. ................ 358/1.15 |
| 8,159,709 B2* | 4/2012 | Young et al. ................. 358/1.16 |
| 8,248,641 B2* | 8/2012 | Kazume et al. .............. 358/1.15 |
| 8,264,723 B2* | 9/2012 | Gotoh et al. ................. 358/1.15 |
| 8,335,003 B2* | 12/2012 | Tachibana .................... 358/1.15 |
| 2002/0131059 A1* | 9/2002 | Tsuchitoi ...................... 358/1.1 |

(Continued)

FOREIGN PATENT DOCUMENTS

| JP | 10-011233 | 1/1998 |
| JP | 11-112722 | 4/1999 |

(Continued)

OTHER PUBLICATIONS

David Kappos, Subject Matter Eligibility of Computer Readable Media, US Patent and Trademark Office, Feb. 23, 2010, 1351 OG 212.*

(Continued)

*Primary Examiner* — King Poon
*Assistant Examiner* — Ted Barnes
(74) *Attorney, Agent, or Firm* — Oblon, Spivak, McClelland, Maier & Neustadt, L.L.P.

(57) ABSTRACT

A printing system includes a storage unit that stores printing status information and host apparatus identification information. The printing status information includes a printing status representing whether a printing processing of the print job is interrupted, and the host apparatus identification information represents the host apparatus as a requestor of the print job. The printing system includes a update unit that updates the printing status information based on a monitoring result of the printing apparatus; a job managing unit that judges whether to execute the print job according to the printing status information when receiving a processing request of the print job from the host apparatus; and a printing status information managing unit that decides printing status information to be stored in the storage unit. The printing status information managing unit first deletes, from the storage unit, printing status information on a print job transmitted from a low-ranked host apparatus.

15 Claims, 11 Drawing Sheets

(56) References Cited

U.S. PATENT DOCUMENTS

| | | | |
|---|---|---|---|
| 2004/0190039 A1* | 9/2004 | Lay et al. | 358/1.14 |
| 2004/0218204 A1* | 11/2004 | Nomura | 358/1.14 |
| 2006/0095500 A1* | 5/2006 | Kato | 709/201 |
| 2007/0046973 A1* | 3/2007 | Toda | 358/1.13 |
| 2009/0006733 A1* | 1/2009 | Gold et al. | 711/111 |
| 2009/0066989 A1* | 3/2009 | Kazume | 358/1.14 |
| 2009/0091783 A1* | 4/2009 | Kazume et al. | 358/1.15 |
| 2009/0225354 A1* | 9/2009 | Yonezawa | 358/1.15 |
| 2009/0225355 A1* | 9/2009 | Kazume et al. | 358/1.15 |
| 2009/0276781 A1* | 11/2009 | Chan et al. | 718/103 |
| 2009/0303534 A1* | 12/2009 | Gotoh et al. | 358/1.15 |
| 2009/0310175 A1 | 12/2009 | Yoshizumi et al. | |
| 2010/0020358 A1* | 1/2010 | Tomomatsu | 358/3.06 |

FOREIGN PATENT DOCUMENTS

| | | |
|---|---|---|
| JP | 2004-167942 | 6/2004 |
| JP | 2004-310215 | 11/2004 |
| JP | 2007-094721 | 4/2007 |
| JP | 2007-272832 | 10/2007 |
| JP | 2009-217306 | 9/2009 |

OTHER PUBLICATIONS

U.S. Appl. No. 12/878,639, filed Sep. 9, 2010, Hirakawa, et al.
Japanese Office Action dated Jul. 16, 2013 for Japanese Patent Application No. 2009-274496.

* cited by examiner

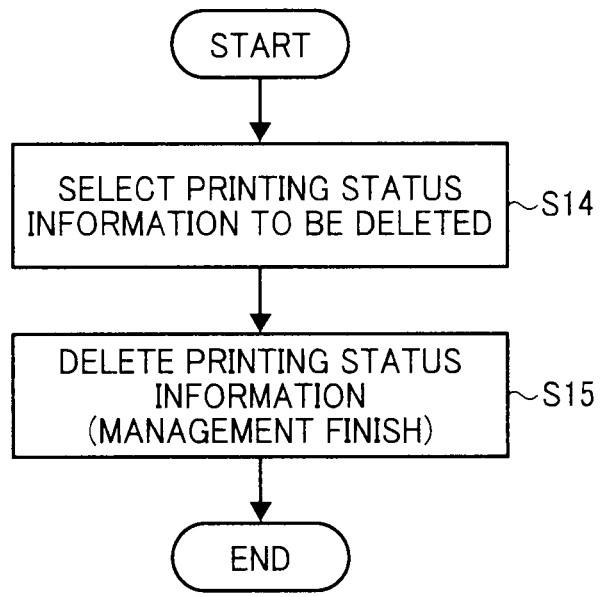

| IP ADDRESS | RANK | TIME LIMIT |
|---|---|---|
| 133.139.xxx.yyy | 1 | 30 MINUTES |
| 133.139.aaa.bbb | 1 | 20 MINUTES |
| 133.139.ccc.ddd | 2 | 5 MINUTES |
| 133.139.eee.fff | 2 | 5 MINUTES |

PRINTING SYSTEM, PRINTING APPARATUS, PRINTING METHOD, AND STORAGE MEDIUM

CROSS-REFERENCE TO RELATED APPLICATIONS

The present application claims priority to and incorporates by reference the entire contents of Japanese Patent Application No. 2009-274496 filed in Japan on Dec. 2, 2009.

BACKGROUND OF THE INVENTION

1. Field of the Invention

The present invention relates to a printing system, a printing apparatus, a printing method, and a storage medium.

2. Description of the Related Art

As a conventional printing system in which a plurality of host apparatuses is connected to a printing apparatus via an electric communication line, Japanese Patent Application Laid-open No. 2007-272832 discloses a printing system in which data such as the number of printed pages is stored for each print job, and even when a printing process is interrupted due to a certain trouble such as communication disconnection, after the trouble is solved, printing can be smoothly resumed from a page next to a printed page based on the stored data.

In the conventional printing system, the data such as the number of printed pages on a certain print job is stored in a storage device such as a hard disk. When a request of a new print job is made by the host apparatus and sent it to the printing apparatus, an area for storing data representing the number of printed pages on the new print job is reserved in the storage device. At this time, since the storage capacity of the storage device is limited, data of a new print job is overwritten on data of a certain old print job.

However, if new data is overwritten on the data on the print job in which the printing process is interrupted due to a certain trouble such as communication disconnection, after the trouble is solved, it is difficult to smoothly resume printing from a page next to a printed page. Particularly, it is necessary to more smoothly or more clearly complete the printing process of the print job from a principal host apparatus among the plurality of host apparatuses.

SUMMARY OF THE INVENTION

It is an object of the present invention to at least partially solve the problems in the conventional technology.

According to an aspect of the present invention, there is provided a printing system that comprises a plurality of host apparatuses and a printing apparatus that are connected via an electric communication line. The printing apparatus executes a printing process for a print job that includes printing data transmitted from the host apparatuses and a processing instruction. The printing system includes a printing status information storage unit configured to store therein printing status information and host apparatus identification information so as to be associated with each other, wherein the printing status information includes a printing status representing whether or not a printing processing of the print job in the printing apparatus is interrupted, and the host apparatus identification information represents the host apparatus as a requestor of the print job; a printing status information update unit configured to update the printing status information stored in the printing status information storage unit based on a monitoring result of the printing apparatus; job managing unit configured to judge whether to execute the print job in the printing apparatus according to the printing status information when receiving a processing request of the print job from the host apparatus; and a printing status information managing unit configured to decide printing status information to be stored in the printing status information storage unit. The printing status information managing unit is further configured to first delete, from the printing status information storage unit, printing status information on a print job transmitted from a low-ranked host apparatus that is previously set.

According to another aspect of the present invention, there is provided a printing method performed in a printing system including a plurality of host apparatuses and a printing apparatus that are connected via an electric communication line. The printing apparatus executes a printing process for a print job that includes printing data transmitted from the host apparatuses and a processing information. The printing method includes storing, in a storage unit, printing status information and host apparatus identification information so as to be associated with each other, wherein the printing status information includes a printing status representing whether or not a printing processing of the print job in the printing apparatus is interrupted, and the host apparatus identification information represents the host apparatus as a requestor of the print job; updating the printing status information stored in the storage unit based on a monitoring result of the printing apparatus; judging whether to execute the print job in the printing apparatus according to the printing status information when receiving a processing request of the print job from the host apparatus; deciding printing status information to be stored in the storage unit; and deleting first, from the storage unit, printing status information on a print job transmitted from a low-ranked host apparatus that is previously set.

According to still another aspect of the present invention, there is provided a computer readable storage medium that stores a computer program that causes a computer to execute the above-described printing method The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a diagram illustrating an example of a time limit information table;

FIG. 10 is a flowchart illustrating an example of a procedure of updating printing status information in a printing apparatus;

DETAILED DESCRIPTION OF THE PREFERRED EMBODIMENTS

Figure 1:
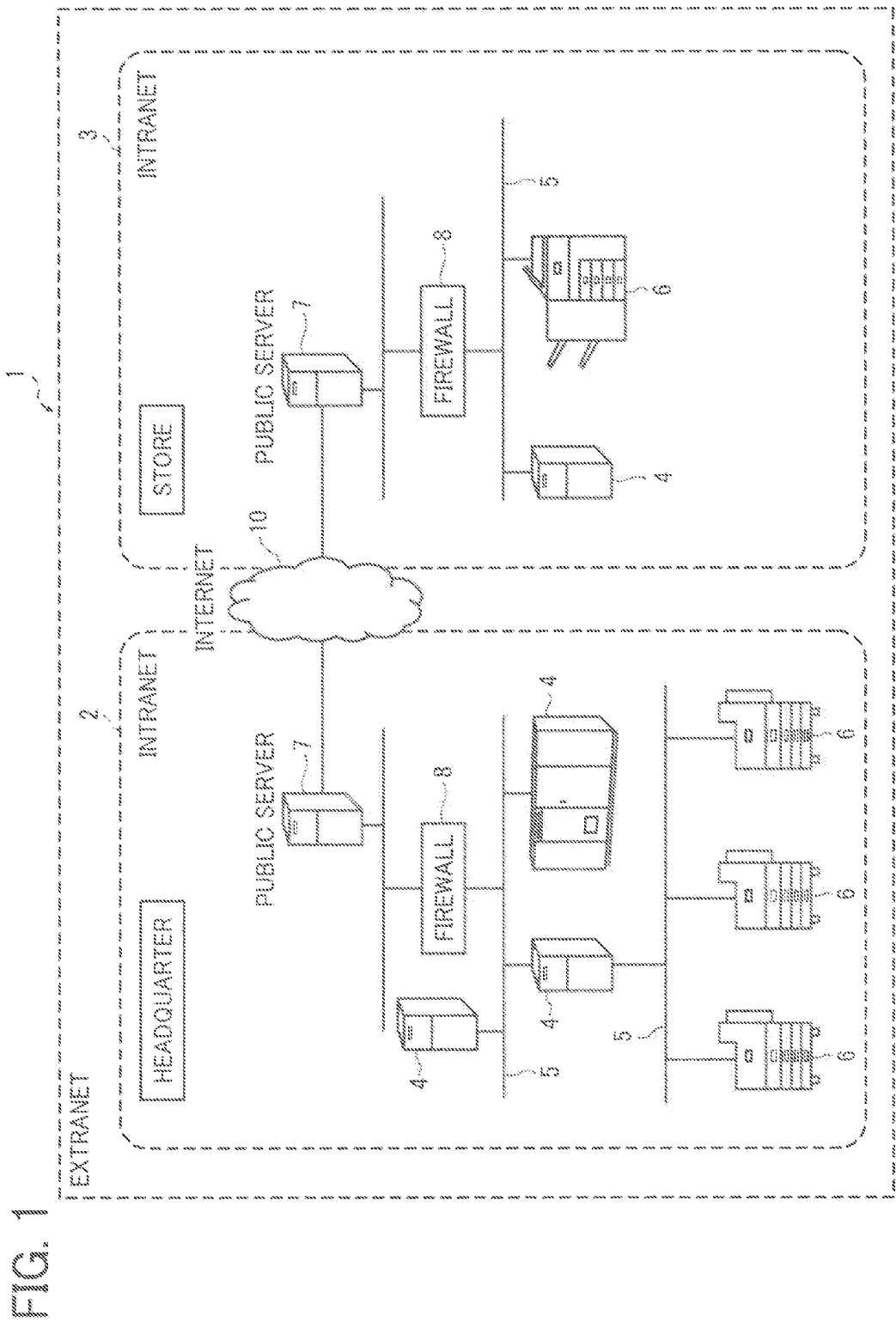
FIG. 1 is a schematic diagram illustrating an example of the whole structure of a printing system according to an embodiment of the present invention.

Hereinafter, exemplary embodiments of the present invention will be explained in detail with reference to the accompanying drawings. The exemplary embodiments and exemplary modifications include the same components. Therefore, the same components are denoted by the same reference numerals, and a duplicated description thereof will not be repeated.

A Structure of a Printing System

As illustrated in FIG. 1, a printing system 1 according the present embodiment is configured as an extranet in which intranets 2 and 3 of a plurality of companies or offices, that is, the intranets 2 and 3 that are company networks based on an Internet technique are connected to each other via the Internet 10.

For example, the intranet 2 of a headquarter of convenience stores or the like is configured as a server-client system in which a plurality of clients 6 such as computers or printers is connected to a variety of server computers 4 (hereinafter, referred to as "server") through a company network (an electric communication line) 5 such as a local area network (LAN). In the intranet 2, a firewall 8 is installed in a boundary between the Internet (the electric communication line) 10 and the company network 5 except for a public server 7 such as a world wide web (WWW) server. The firewall 8 ensures security in the company network 5 by monitoring a packet input and output between the company network 5 and the Internet 10 and allowing the packet to pass or blocking (discarding) the packet according to an established rule.

The intranet 3 of franchise stores is also configured as a server-client system in which a plurality of clients 6 such as computers or printers is connected to a variety of servers 4 via the company network 5 such as a LAN. In the intranet 3, the firewall 8 is also installed in a boundary between the Internet 10 and the company network 5 except for the public server 7.

The intranets 2 and 3 may be connected via a dedicated communication line other than the Internet 10. At least part of the network 5 may be configured by a wireless communication system (an infrared ray or an electric wave). Further, a system employing an optical fiber may be used.

Figure 2:
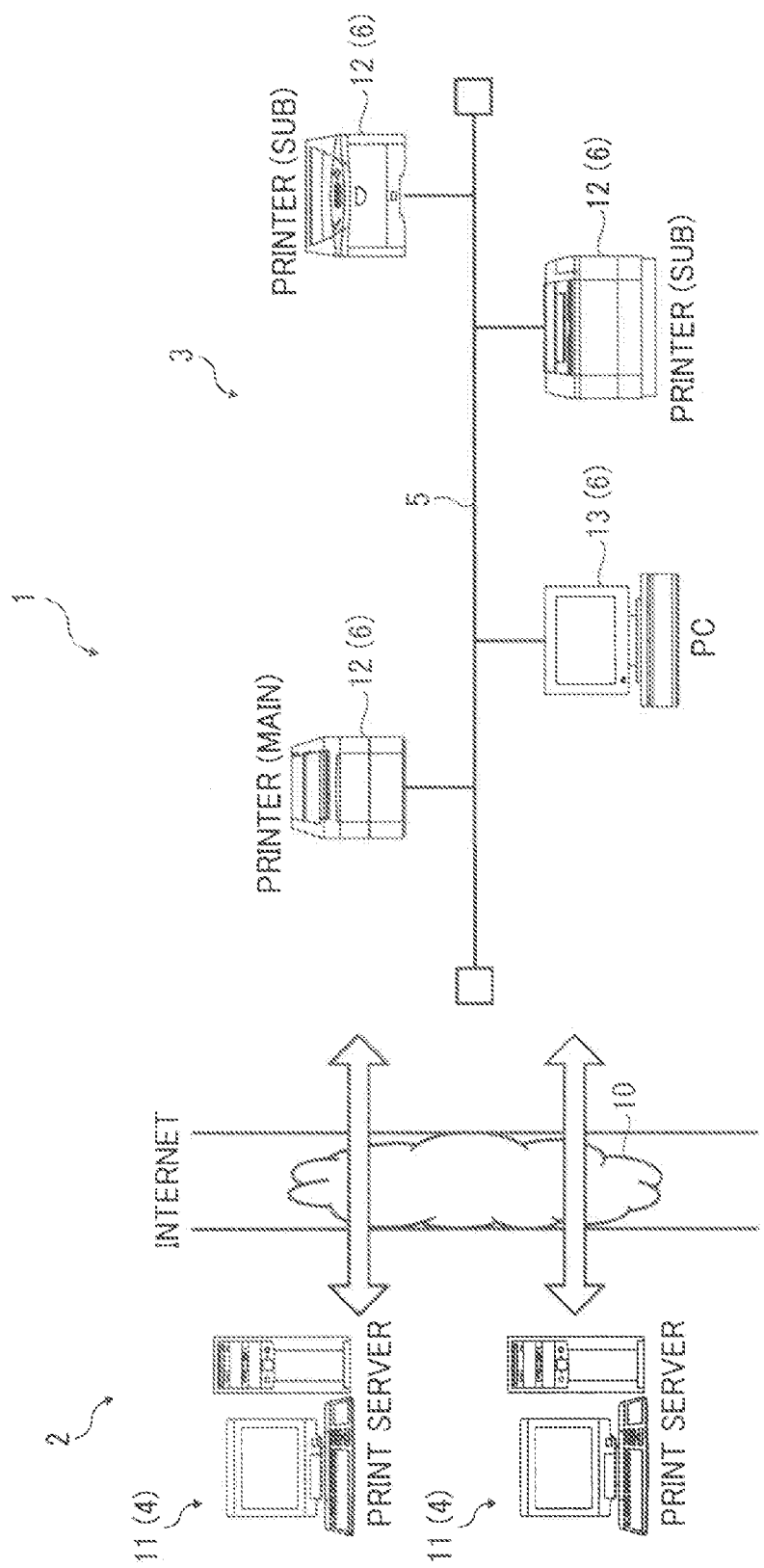
FIG. 2 is a schematic diagram illustrating an example of a partial structure of a printing system.

As illustrated in FIG. 2, the printing system 1 executes a print job for printing a sales promotional material requested from a print server 11 as a host apparatus that is one of the servers 4 included in the intranet 2 of the headquarter of the convenience stores, using a printer 12 as a printing apparatus that is one of the clients 6 included in the intranet 3 of the franchise stores. In the present embodiment, the intranet 3 includes a plurality of printers 12 and a personal computer (PC) 13. In the intranet 3, the three printers 12 are connected, and the printer (main) 12 positioned at the highest position and the printers (sub) 12 positioned at a subordinate position are connected to each other via the network 5. The plurality of print servers 11 as the server 4 is connected to the intranet 3 via the Internet 10. The printer 12 executes the print job requested from the print servers 11.

A Structure of the Print Server

Figure 3:
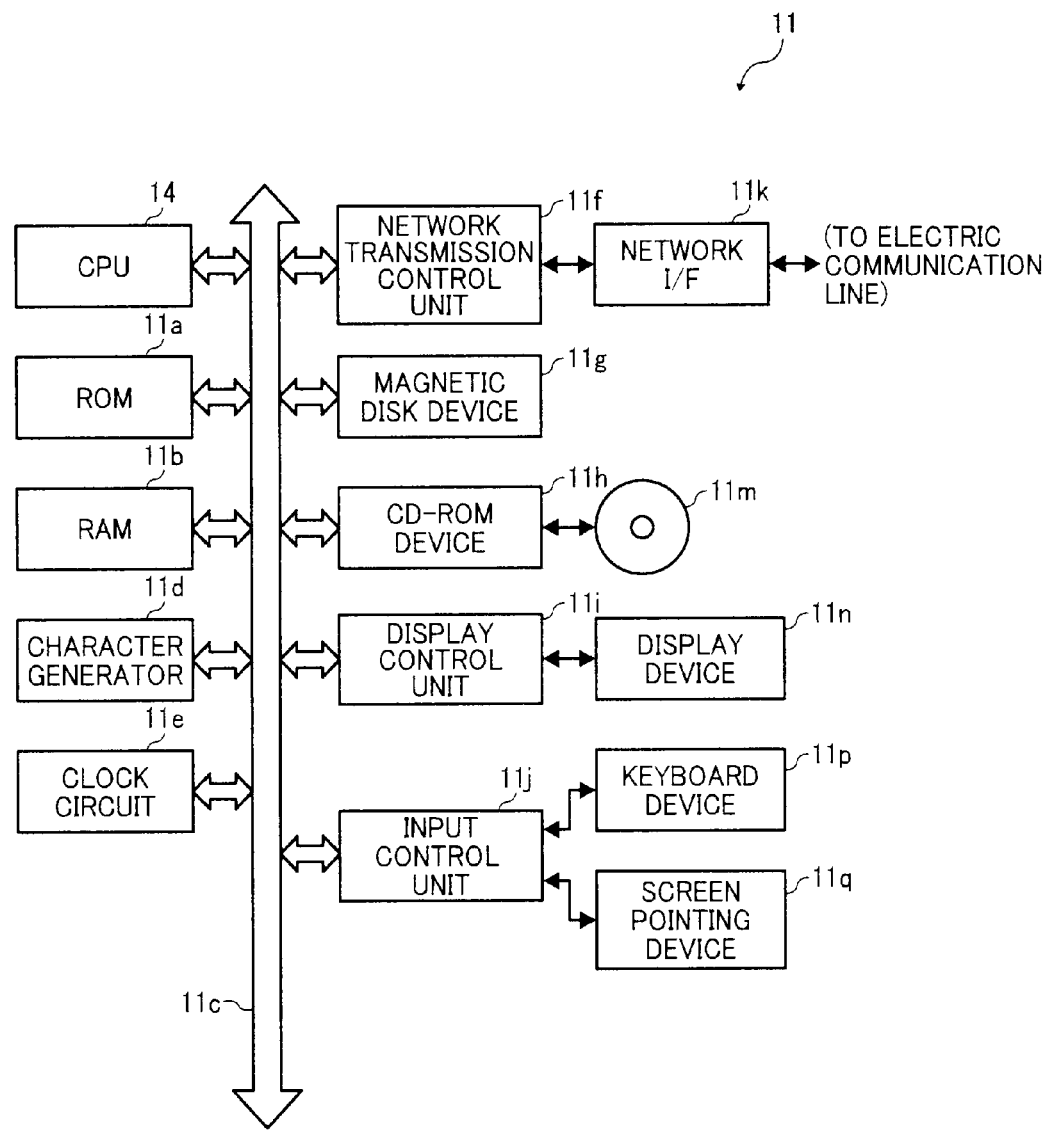
FIG. 3 is a block diagram illustrating an example of a structure of a print server.

As illustrated in FIG. 3, the print server 11 includes a central processing unit (CPU) 14 for controlling an operation of the print server 11. A read only memory (ROM) 11a that stores a program to be executed when the CPU 14 starts and necessary data and a random access memory (RAM) 11b that constitutes a work area of the CPU 14 are connected to the CPU 14 via an internal bus 11c.

A character generator 11d, a clock circuit 11e, a network transmission control unit 11f, a magnetic disk device 11g, a CD-ROM device 11h, a display control unit 11i, and an input control unit 11j are connected to the CPU 14 via the internal bus 11c. Data exchange between the components is mainly performed via the internal bus 11c.

The character generator 11d generates display data of a graphic character. The circuit 11e output current date and time information.

The network transmission control unit 11f executes a communication control of a variety of predetermined protocol suites for exchanging a variety of data with another server 4 or the client 6 via an electric communication line such as a network interface 11k and the network 5. The network interface 11k is connected to the printer 12 that is one of the clients 6 of another intranet (here, the intranet 3) via the network 5 or the Internet 10, and transmits printing data to the printer 12 and receives data indicating a printing process status from the printer 12.

The magnetic disk device 11g stores an operating system (OS), a variety of application programs that operate on the OS, a variety of data such as work data, file data, and image information data. In the present embodiment, a printing data transmission program is stored as an application program. The CD-ROM device 11h reads in data (a variety of application programs, a variety of data such as work data, file data, and image information data) stored in a CD-ROM 11m as an exchangeable storage medium.

When a user supplies electric power to the print server 11, the CPU 14 starts a loader (a program) in the ROM 11a, reads the OS from the magnetic disk device 11g into the RAM 11b, and starts the OS. The started OS starts the application program or reads in or stores information in response to the user's operation. The storage medium is not limited to the CD-ROM 11m and may include a computer readable storage medium such as a flexible disk (FD), a CD-R, a CD-RW, a DVD, and a semiconductor memory. In this case, the CD-ROM device 11h may be replaced with a device that can read in data of the storage medium. The application program may not only operate on a predetermined OS but also allow the OS to execute part of a variety of processes which will be described later. The application program may also be included as part of a group of program files that constitute predetermined application software or OS.

The application program installed in the magnetic disk device 11g of the print server 11 is generally stored in a storage medium such as the CD-ROM 11m, and the application program stored in the storage medium is installed in the magnetic disk device 11g. Therefore, the storage medium having portability like the CD-ROM 11m can be used as the storage medium for storing the application program. Further, the application program may be taken in from the outside via the network interface 11k and installed in the magnetic disk device 11g.

The display control unit 11i controls a display device 11n such as a liquid crystal display (LCD) or a cathode ray tube (CRT) and displays a character or an image corresponding to display data received from the CPU 14 on the display device 11n. The input control unit 11j receives an input signal according to a key operation with a keyboard device 11p or an input signal according to an operation of a screen pointing device 11q such as a mouse or a pointing device and notifies the CPU 14 of the input signal.

Printing document information is stored in the print server 11 such that the print server 11 starts an appropriate application program, and the application program creates printing document information and stores the printing document information in the magnetic disk device 11g, or printing document information stored in the CD-ROM 11m is read out by the CD-ROM device 11h and taken into the print server 11, or printing document information is reconstructed from information received through an electronic mail via the network 5 and the Internet 10 and taken into the print server 11.

A Structure of the Printer

Figure 4:
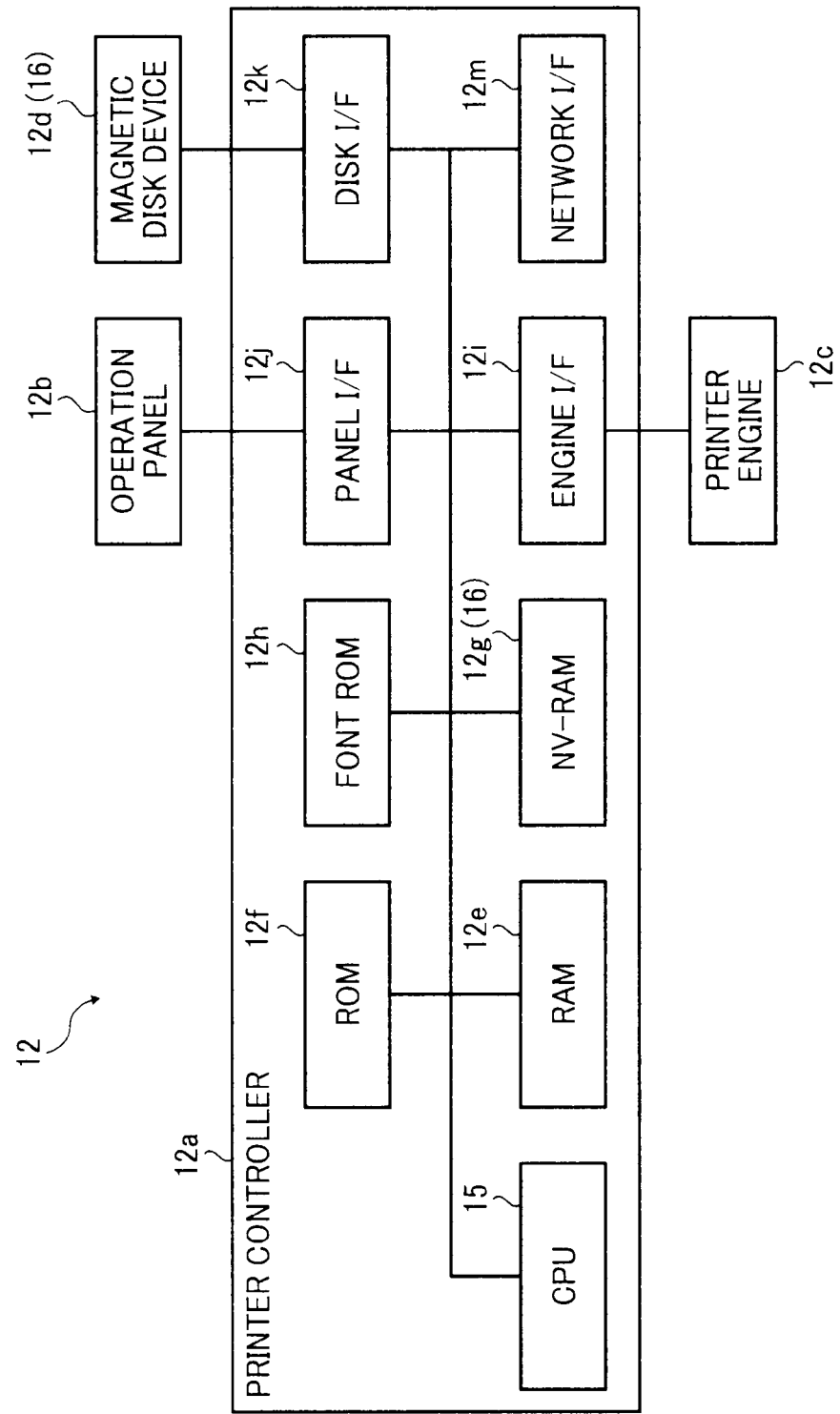
FIG. 4 is a block diagram illustrating an example of a hardware structure of a printing apparatus.

As illustrated in FIG. 4, the printer 12 includes a printer controller (a motherboard) 12a for controlling all parts of the printer 12. An operation panel 12b, a printer engine 12c, and a magnetic disk device 12d are connected to the printer controller 12a. According to the present embodiment, the main printer 12 and the sub printers 12 may basically have the same structure.

The printer controller 12a is a general term of a control mechanism that converts printing data from the server 4 of the intranet 2 or 3 (for example, the print server 11 of the intranet 2) to drawing data according to a set control mode and a printing code from the server 4 of the intranet 2 or 3 (for example, the print server 11 of the intranet 2) and outputs the drawing data to the printer engine 12c. The printer controller 12a includes the following modules. That is, the printer controller 12a includes a CPU 15 as a main control part, a RAM 12e, a ROM 12f that stores a variety of information specific to the printer 12, an NV-RAM 12g as a non-volatile memory that can store data regardless of power on/off, a font ROM 12h as a memory that stores a variety of fonts used at the time of printing, an engine interface 12i, a panel interface 12j connected to the operation panel 12b, a disk interface 12k connected to the magnetic disk device 12d, and an network interface 12m.

The operation panel 12b is a switch unit that can change a status display, an operation mode, and a printing condition of the printer 12.

The printer engine 12c forms an image through an electrophotographic process technique, and records and outputs the image on a recording paper. Specifically, based on drawing data and control information from the printer controller 12a, an electrostatic latent image is formed on a photoreceptor (not shown), and an image is formed on a transfer paper sheet fed by a paper feed unit (not shown).

The magnetic disk device 12d stores therein a variety of printing document information or other appropriate information files. The magnetic disk device 12d also stores therein the OS and a variety of application programs that operate on the OS. In the present embodiment, a printing process program is stored as the application program.

The RAM 12e is used as a work area of the CPU 15, a data reception buffer for receiving data from the servers 4 of the intranets 2 and 3, and an image developing area for developing an image after processing.

The engine interface 12i is an interface that transmits a control signal from the printer controller 12a to the printer engine 12c and receives a status signal that is transmitted from the printer engine 12c to the printer controller 12a.

The network interface 12m is an interface that receives a control signal that is transmitted from the server 4 of the intranet 2 or 3 (for example, the print server 11) to the printer 12, transmits or receives data, and receives a status signal from the printer 12.

Similarly to the server 4, when the user supplies electric power to the printer 12 having the above-described structure, the CPU 15 reads in the OS from the magnetic disk device 12d and starts the OS. The started OS starts the application program or reads in or stores information in response to the user's operation. The application program may not only operate on a predetermined OS but also allow the OS to execute part of a variety of processes which will be described later. The application program may also be included as part of a group of program files that constitute predetermined application software or OS.

The application program installed in the magnetic disk device 12d of the printer 12 is generally stored in a storage medium such as a CD-ROM (not shown), and the application program stored in the storage medium is installed in the magnetic disk device 12d. Therefore, the storage medium having portability like a CD-ROM can be used as the storage medium for storing the application program. Further, the application program may be taken in from the outside via the network interface 12m and installed in the magnetic disk device 12d.

According to the present exemplary embodiment, the application program or the OS is stored in the magnetic disk device 12d, but the application program may be stored in a computer readable storage medium such as a semiconductor memory.

Figure 5:
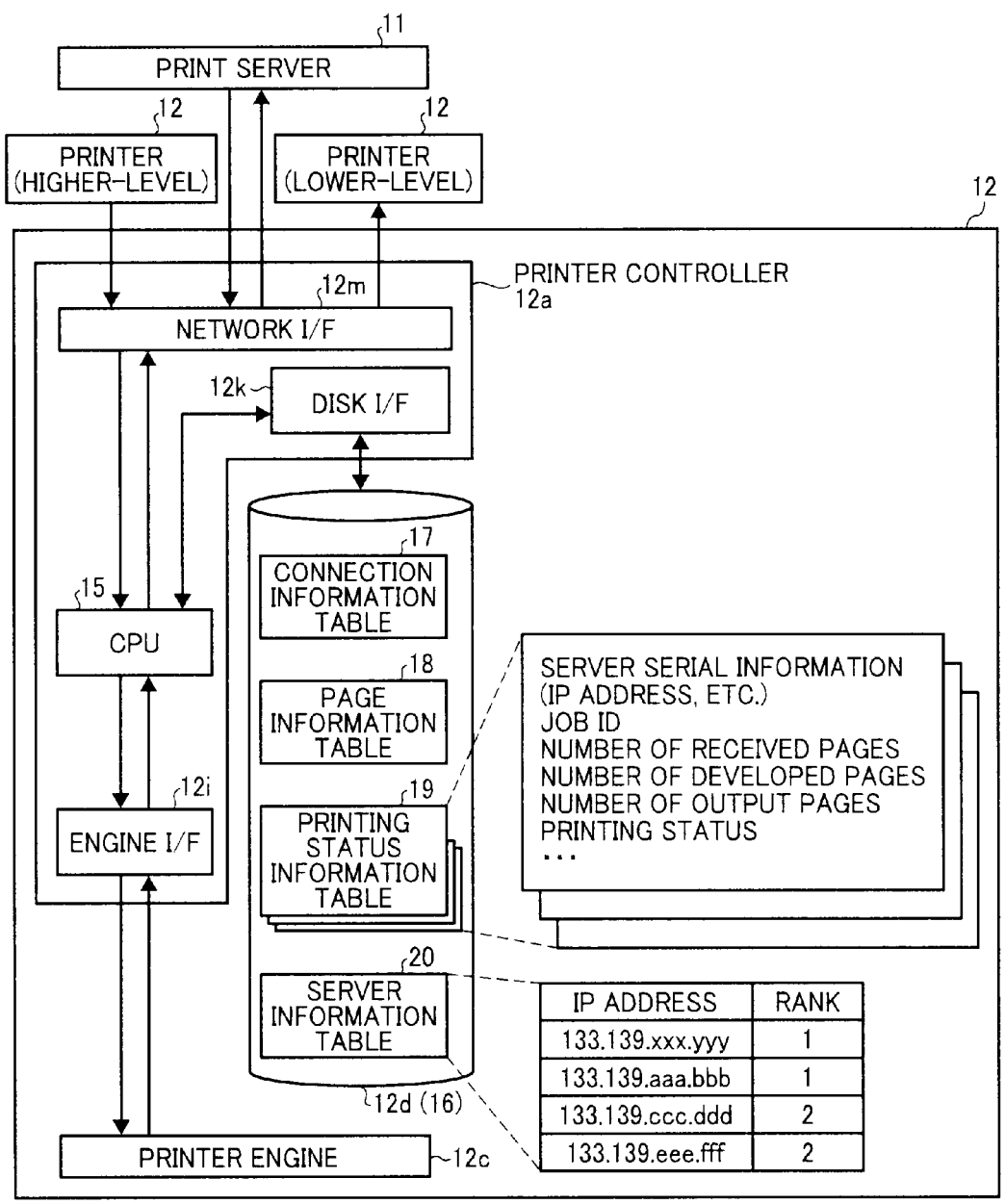
FIG. 5 is a block diagram illustrating an example of a structure of a printing apparatus.

The magnetic disk device 12d also stores therein a connection information table 17, a page information table 18, a printing status information table 19, and a server information table 20 as illustrated in FIG. 5. Information of the tables 17 to 20 are used in a printing process, a printing alternative process of changing the printer 12 that is to execute the printing process (a job allocation change process), a process of judging whether to execute the print job with the printer 12, and processes of deleting, newly registering, and updating printing status information.

The connection information table 17 includes information of the printer 12 necessary for executing the printing alternative process such as the number of the printers 12 that constitute a group for performing an alternative process and IP addresses of the printers 12 (the main printer and the sub printers). The page information table 18 includes information related to the printing process in the printing alternative process such as a job ID, the number of printed pages, the number of printers, and an IP address of the printer. The printing status information table 19 includes identification information of the print server 11 (host apparatus identification information such as an IP address), an ID of the print job (a job ID), the number of received pages, the number of developed pages, the number of output (printed) pages, a printing status representing whether or not the printing process is interrupted, an interruption start time when the printing process is interrupted, and a connection order in which the print server 11 is connected to the printers 12, which are associated with each print job. The print server 11 sequentially outputs the print jobs, and when each of the print servers 11 has one print job at each time, the printing status information table 19 corresponds to each of the print servers 11.

The server information table 20 includes information representing a rank of each the print server 11. In the present embodiment, the rank of the print server 11 is classified into two, and the print server 11 that is high in importance and priority has a rank "1," and the print server 11 that is low in importance and priority has a rank "2." The rank of the print server 11 can be changed by an input operation of the operation panel 12b of the printer 12 (see FIG. 4), an input unit of the PC 13 (see FIG. 2), the keyboard device 11p of the print server 11, or the screen pointing device 11q. That is, in the present embodiment, the CPU 15 of the printer 12 also functions as a rank rewriting unit.

At least part of the information stored as the tables 17 to 20 may be stored in the NV-RAM 12g. That is, in the present embodiment, the magnetic disk device 12d and the NV-RAM 12g as a non-volatile storage device are used as a printing status information storage unit 16.

Figure 6:
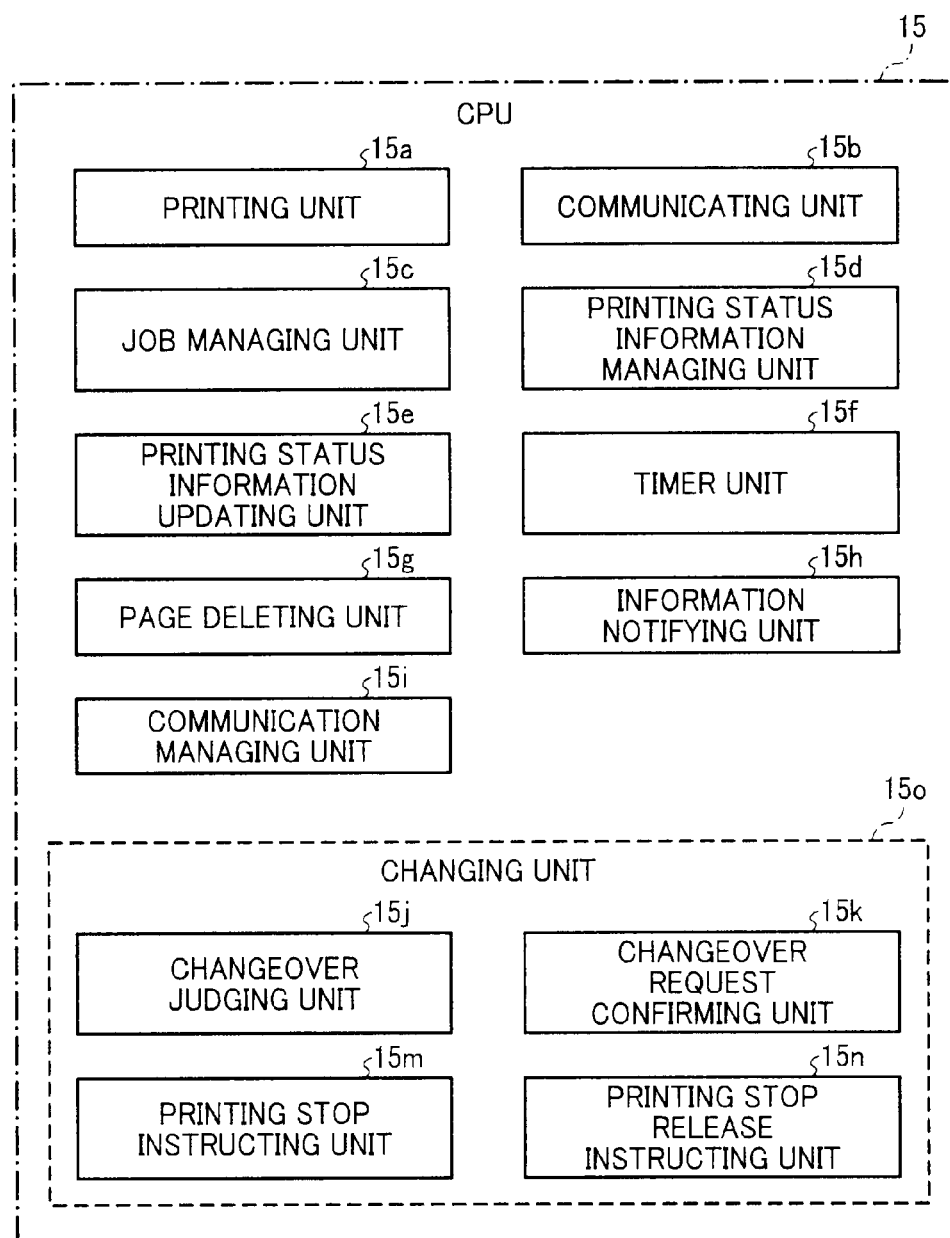
FIG. 6 is a block diagram illustrating an example of a CPU of a printing apparatus.

In the present embodiment, the CPU 15 operates as a printing unit 15a, a communicating unit 15b, a job managing unit 15c, a printing status information managing unit 15d, a printing status information updating unit 15e, a timer unit 15f, a page deleting unit 15g, an information notifying unit 15h, and a communication managing unit 15i as illustrated in FIG. 6 by executing the application program stored in the RAM 12e. A changing unit 15o includes a changeover judging unit 15j, a changeover request confirming unit 15k, a printing stop instructing unit 15m, and a printing stop release instructing unit 15n. That is, a program for the printer controller 12a includes modules that have the CPU 15 to operate as the printing unit 15a, the communicating unit 15b, the job managing unit 15c, the printing status information managing unit 15d, the printing status information updating unit 15e, the timer unit 15f, the page deleting unit 15g, the information notifying unit 15h, and the communication managing unit 15i, the changing unit 15o, the changeover judging unit 15j, the changeover request confirming unit 15k, the printing stop instructing unit 15m, and the printing stop release instructing unit 15n, respectively.

The printing unit 15a controls the printer engine 12c to execute the printing process according to the print job constituted by printing data and a processing request.

The communicating unit 15b performs data communications between the respective components of the CPU 15 and between the inside and the outside of the CPU 15.

The job managing unit 15c receives the processing request of the print job (a device acquisition request) from the print server 11 and judges whether to execute the print job with the printer 12 with reference to the printing status information stored in the printing status information table 19.

The printing status information managing unit 15d decides printing status information to be stored in the printing status information storage unit 16 and deletes the printing status information or newly registers the printing status information to the printing status information table 19, according to a predetermined algorithm specified in a program, for example, at a time when a request is received from the printing server 11 or when the printing status information is updated by the printing status information updating unit 15e, or at a predetermined timing (for example, a regular time interval or a prescribed management timing). When each of the print servers 11 has one print job at each time, the printing status information managing unit 15d decides that printing status information sent from which print server 11 is to be stored in the printing status information storage unit 16.

The printing status information updating unit 15e monitors the printer 12 and updates the printing status information table 19, for example, at a time when a request is received from the print server 11, when a detection result of a well-known sensor disposed inside the printer 12 changes, or when a change in a target page of each processing is notified from the CPU 15, or at a predetermine timing (for example, a regular time interval or prescribed monitoring timing). The printing status information updating unit 15e updates, for example, the number of received pages, the number of developed pages, the number of output pages, and the printing status.

The communication managing unit 15i manages communications (sessions) with the print server 11. The communication managing unit 15i stores identification information such as an IP address of the print server 11 in the storage unit such as the NV-RAM 12g when connected with the print server 11. Therefore, when communication disconnection occurs, reconnection (session resumption) can be more easily performed.

The changing unit 15o performs a process (a printing alternative process) of changing the job allocation (which is also called a printing right) representing which printer 12 executes the print job among the plurality of printers 12. The order of changing the job allocation is set in advance. The changeover judging unit 15j judges whether to change the job allocation to another printer 12 according to an error occurrence state in the printers 12. The changeover request confirming unit 15k confirms whether or not a changeover request is present. When the changeover request is present, the job allocation of the printer 12 is forcibly changed to another printer (a lower-level printer) 12. The printing stop instructing unit 15m instructs another printer (a lower-level printer) 12 to stop printing, and the printing stop release instructing unit 15n instructs another printer (a lower-level printer) 12 to release the printing stop. In the present embodiment, the job allocation (the printing right) for executing the print job is changed by the printing stop and canceling of the printing stop. The storage unit (the RAM 12e, the NV-RAM 12g, or the magnetic disk device 12d) of each printer 12 stores therein information related to the printing stop (for example, printing stop: 1 and print stop release: 2) as information representing the job allocation (the printing right).

The timer unit 15f times a time interval at which the printing status information updating unit 15e performs monitoring or updating of the printing status or a time lapsed after the print job is interrupted when the print job is interrupted. The page deleting unit 15g performs a synchronization process of printing data (print jobs) stored in the respective printers 12. The content of the printing data is stored in the page information table 18.

The information notifying unit 15h notifies the print server 11 of a variety of information. For example, when the printing status information managing unit 15d deletes the printing status information table 19 (the printing status information) stored in the printing status information storage unit 16, the information notifying unit 15h transmits a notice indicating that the printing status information was deleted to the printing server 11 that is a requestor of the print job of the deleted printing status information via the network interface 12m. That is, in the present embodiment, the information notifying unit 15h corresponds to a deletion notifying unit. The information notifying unit 15h transmits a printing status notice for informing the number of output (printed) pages and the printing status to the print server 11.

An Operation of the Printing System

Figures 7, 7A, 7B:
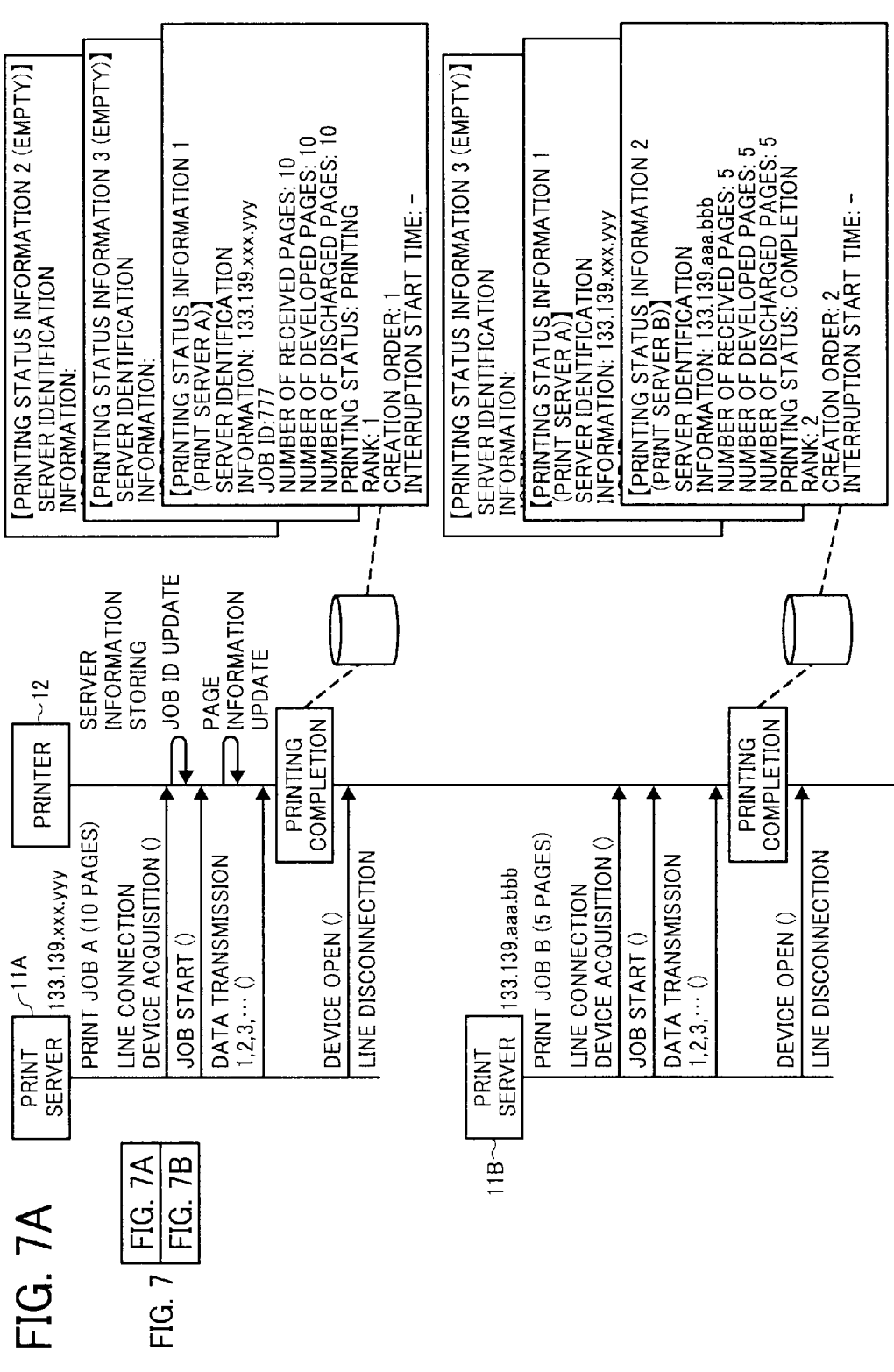
FIG. 7 is a sequence diagram illustrating an example of a procedure of executing a print job in a printing system.
Figure 7B:
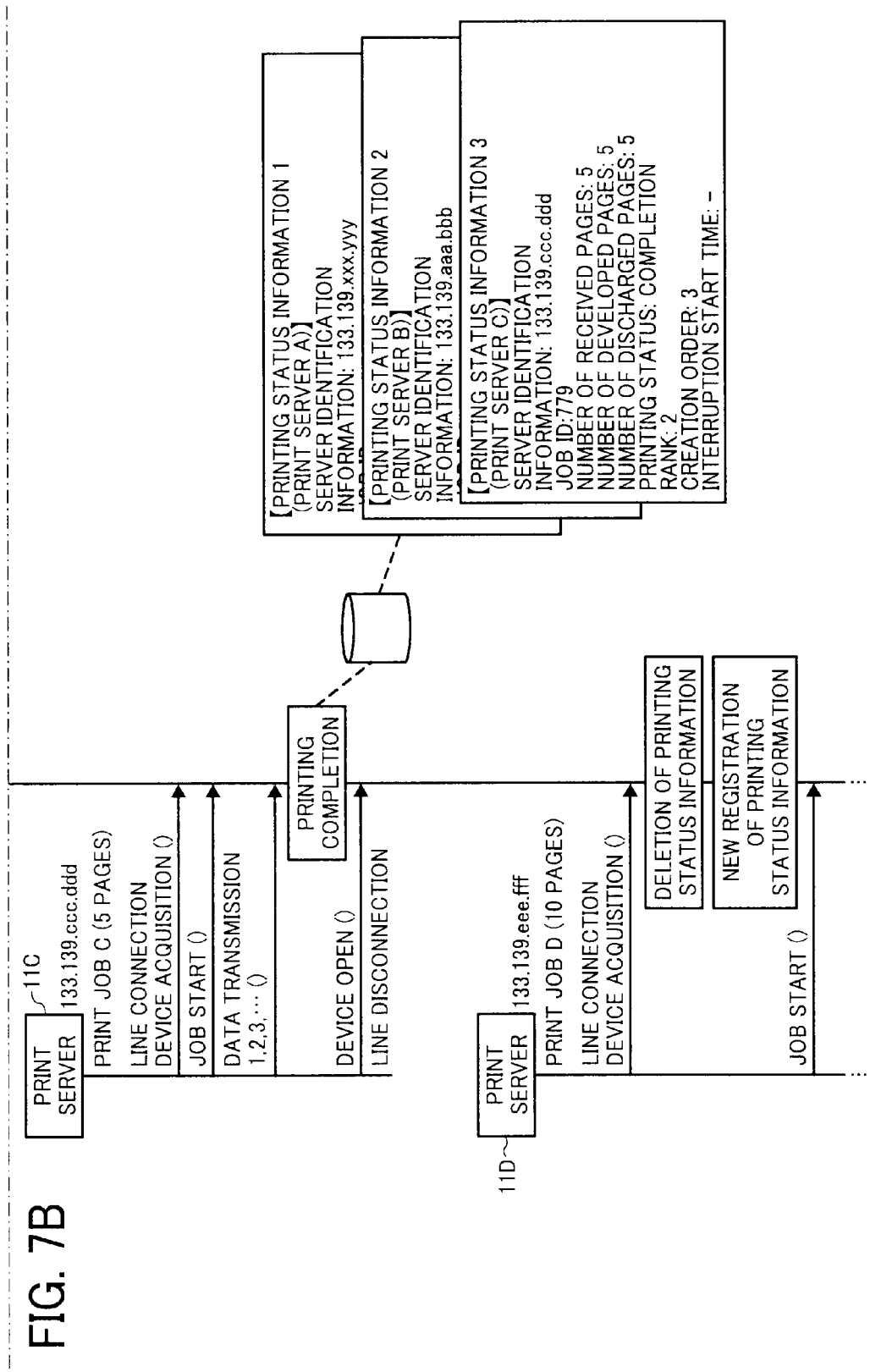

FIG. 7 is a sequence diagram when the print jobs from four print servers 11A to 11D are performed in the printer 12. As illustrated in FIG. 7, when lines are connected and so a session is established, the print server 11A transmits a device acquisition request to the printer 12. At this time, even though not shown in FIG. 7, each of the printers 12 (see FIG. 2) that constitutes a printer group in the intranet 3 receives the device acquisition request and transmits the device acquisition request, connection data, and a printing stop request to a one level lower printer 12 that is set as a transmission destination.

At this time, each printer 12 writes data necessary for device acquisition or the job allocation (the IP address of the corresponding printer 12) in the connection data. A device acquisition response to the device acquisition request is transmitted to higher-level printers 12 sequentially from the lowest level printer 12. In this structure, since only the printer that initially received the device acquisition request did not receive the printing stop request, the job allocation is set to this printer 12, and a printer group that can support the changeover process of the print job is configured with the plurality of printers 12.

Subsequently, the print server 11A transmits a job start request and printing data for the print job A to the printer 12 (typically to the main printer 12). When the printer 12 receives the device acquisition request or the job start request, the CPU 15 of the printer 12 operates as the printing status information managing unit 15d (see FIG. 6) and newly registers the printing status information table 19 for the print job A to the printing status information storage unit 16. At this time, the printing status is "printing." In the present embodiment, preparing the printing status information table 19 for the new print job is referred to as "new registration." Therefore, "overwriting" of the printing status information table 19 that occurs when the print server 11 receives the new print job also corresponds to "new registration."

When the printing process for the print job A from the print server 11A is completed, the printer 12 sequentially performs the printing process for the print jobs B and C from the other print servers 11B and 11C in the same procedure as described above. In this case, when an empty space is present in the storage capacity of the printing status information storage unit 16 at the time of starting the printing process, the printing status information tables 19 for the print jobs from the print servers 11B and 11C are newly registered. In the present embodiment, when the printing status information table 19 cannot be newly registered to the printing status information storage unit 16, the new print job is not received by the printer 12.

After the printing process for the print jobs A to C from the print servers 11A to 11C is completed, when a processing request on a print job D is newly received from another print server 11D, if an empty space for newly registering the printing status information table 19 is not present in the printing status information storage unit 16, the printer 12 attempts to delete the printing status information table 19 (the printing status information) in an procedure which will be described later. When the printing status information table 19 can be deleted according to a prescribed condition and an empty space for newly registering the printing status information table 19 is formed in the printing status information storage unit 16, the printer 12 performs new registration of the printing status information table 19 (the printing status information) on the print job from the print server 11D. Thereafter, the printer 12 performs the printing process for the print job D from the print server 11D.

In this example, the printing data for the print job A from the print server 11A is transmitted, page by page, by dividing the printing data into plural pieces such as data transmission 1, data transmission 2, and so on. At each time when the printing data is received, developed, and output (printed) by the printer 12 page by page, the CPU 15 of the printer 12 operates as the printing status information updating unit 15e (see FIG. 6) and updates corresponding page information (the number of received pages, the number of developed pages, and the number of output pages) of the printing status information table 19. The printing status information updating unit 15e can monitor and update the printing status at a predetermined time interval regardless of status change timing.

Even though not shown in FIG. 7, for example, when communication is disconnected after printing data of the print job A is transmitted up to 3 pages (data transmission 1, 2, and 3) from the print server 11A to the printer 12, the printer 12 cannot output subsequent pages since the printing data of the print job A is received only up to 3 pages. At this time, the printing process of the print job A from the print server 11A is interrupted. The printer 12 completes output of received data. The CPU 15 of the printer 12 operates as the printing status information updating unit 15e and updates the printing status of the printing status information table from "printing" to "interrupted."

Further, even though not shown in FIG. 7, for example, when the print server 11B different from the print server 11A transmits the processing request (the device acquisition request) of the print job B to the printer 12 at a time during which communication is being disconnected, the CPU 15 of the printer 12 can operate as the job managing unit 15c and execute the print job B from the print server 11B only when a prescribed condition is satisfied, for example, a predetermined time elapsed after an interruption start. In this case, similarly to when the print job A is received, the job start request and data transmissions 1, 2, and so on are transmitted from the print server 11B to the printer 12. The printer 12 completes the print job B. While the print job B is being processed, the CPU 15 operates as the printing status information updating unit 15e and updates the printing status information table 19 as needed.

When communication disconnection between the print server 11A and the printer 12 is resolved, the print server 11A makes the processing request (the device acquisition request) of the print job A again on the print job A. The CPU 15 of the printer 12 receives the processing request, operates as the information notifying unit 15h, and transmits a printing status notice for informing the printing status to the print server 11A. Therefore, the print server 11A can recognize the printing status of the printer 12 and transmit more appropriate data. That is, when it is found, based on the printing status notice, that up to data transmission 2 was completed by the printer 12, the print server 11A can transmit remaining printing data, which is printing data subsequent to data transmission 3. Similarly, when it is found, based on the printing status notice, that three pages were output, the print server 11A can transmit remaining printing data, which is printing data corresponding to a fourth page and subsequent pages.

An Operation of the Printer

Figure 8:
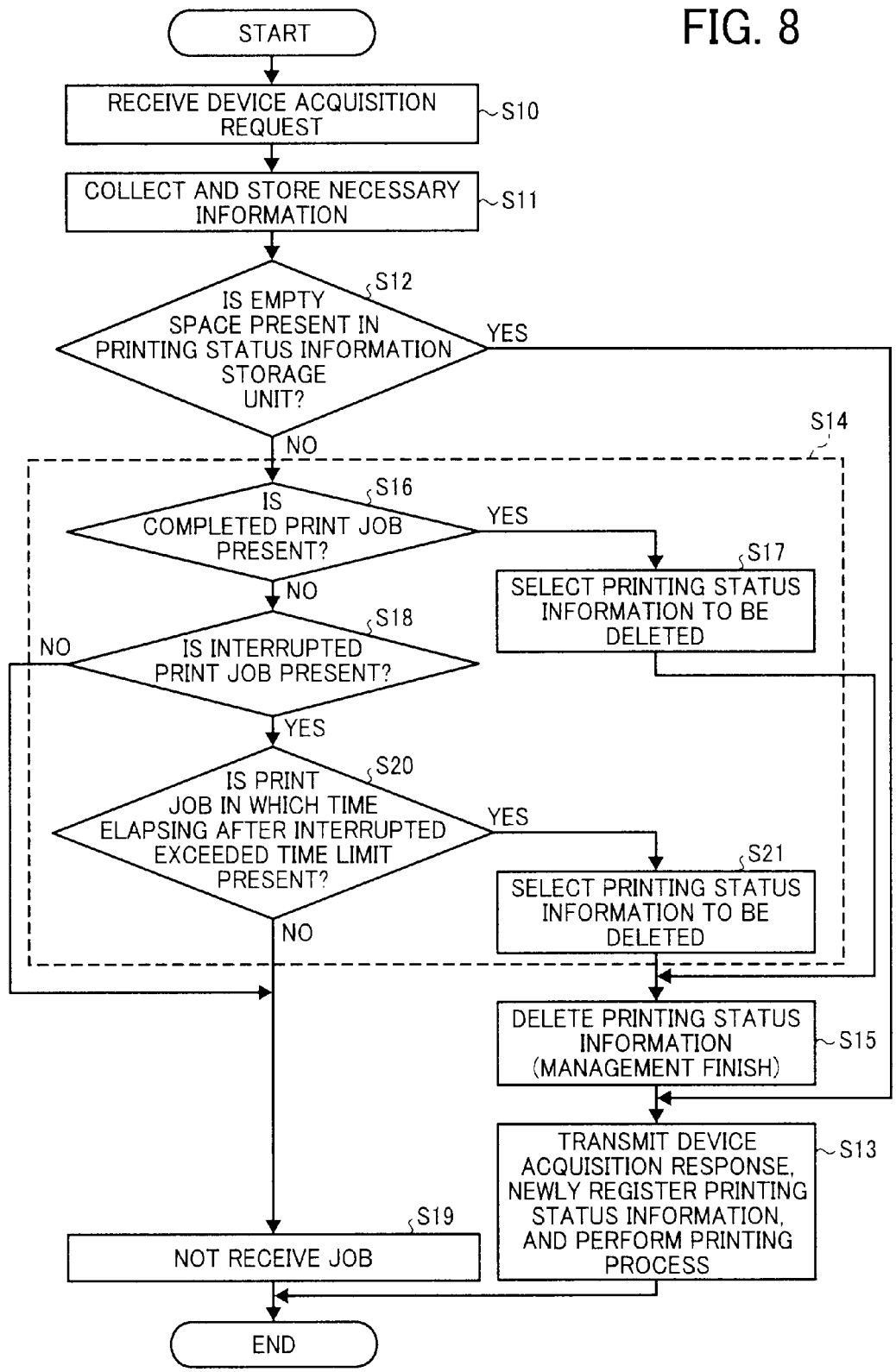
FIG. 8 is a flowchart illustrating an example of a procedure of managing printing status information in a printing apparatus.

As illustrated in FIG. 8, the CPU 15 of the printer 12 receives the device acquisition request as the processing request of the print job (step S10), and reads out information necessary in step S14 (for example, the printing status, the identification information of the print server 11, the rank of the print server 11, the stop starting time, the connection order, the limit time, and whether or not the empty space (the empty capacity) corresponding to the printing status information table 19 is present in the printing status information storage unit 16, for each print job) and stores the information in the RAM 12e as preparation for step S14 of selecting the printing status information to be deleted (step S11).

As described above, in the present embodiment, when the printing status information table 19 cannot be newly registered to the printing status information storage unit 16, the printer 12 does not receive the new print job. That is, after step S11, the CPU 15 operates as the printing status information managing unit 15d and checks whether or not the printing status information storage unit 16 has the empty space for newly registering the printing status information table 19 of the print job whose processing request has been received (step S12). When it is judged in step S12 that the empty space is present, the CPU 15 operates as the job managing unit 15c and controls the network interface 12m to transmit the device acquisition response to the print server 11 that is the requestor of the print job. Subsequently, the CPU 15 operates as the printing status information managing unit 15d and newly registers the printing status information table 19 (the printing status information) on the print job to the printing status information storage unit 16. At this time, when there is no print job that is being performed or interrupted in the printer 12, the CPU 15 operates as the printing unit 15a and controls the printer engine 12c to execute the printing process of the new print job (step S13).

In step S13, when the print job being interrupted in the printer 12 is present, as described above, the printing process for the print job whose processing request has been newly received is first executed under the assumption that a prescribed condition is satisfied, for example, a predetermined time elapsed after interruption. When the prescribed condition is not satisfied, the print job whose processing request has been newly received enters a printing standby state. When the print job being performed in the printer 12 is present, the print job whose processing request has been newly received enters the printing standby state. Then, at a time when the print job being performed is completed, the printing process for the print job whose processing request has been newly received is executed.

When it is judged in step S12 that the empty space for newly registering the printing status information table 19 is not present in the printing status information storage unit 16, the CPU 15 operates as the printing status information managing unit 15d and checks whether or not the printing status information table 19 of the completed print job is present in the printing status information storage unit 16 (step S16). It can be judged based on the printing status whether or not printing of the print job has been completed.

When it is judged in step S16 that the printing status information table 19 of the completed print job is present, the CPU 15 as the printing status information managing unit 15d selects the printing status information table 19 (the printing status information) to be deleted (#1 in step S17). In step S17, when there is only one completed print job, the printing status information table 19 of that print job is selected as a deletion target. When there is the plurality of completed print jobs, the CPU 15 as the printing status information managing unit 15d checks the rank of the print server 11 that is the requestor of the print job and selects the printing status information table 19 related to the print job of the print server 11 having the lowest rank as the deletion target. When there is the plurality of printing status information tables 19 related to the print job of the print server 11 having the lowest rank, the printing status information table 19 that is earlier in a reception time of the print job (that is earlier in connection order) is selected as the deletion target.

Next, in step S15, the CPU 15 as the printing status information managing unit 15d deletes the printing status information table 19 selected as the deletion target in step S17 from the printing status information storage unit 16. Deletion of the printing status information table 19 means that management of the print job related to the printing status information table 19 is finished. Through step S15, the empty space for newly registering the printing status information table 19 is formed in the printing status information storage unit 16. Thereafter, the process proceeds to step S13.

When it is judged in step S16 that there is no printing status information table 19 of the completed print job (No in step S16), the CPU 15 operates as the printing status information managing unit 15d and checks whether or not the printing status information table on the print job being interrupted is present in the printing status information storage unit 16 (step S18). It can be judged based on the printing status whether or not the printing process for the print job is being interrupted.

In the case of the printing status information table on the print job being interrupted is not present (No in step S18), the empty space enough to newly register the printing status information table 19 to the printing status information storage unit 16 is not present, and the printing status information table 19 of the completed print job and the interrupted print job is not present. In this case, all of the printing status information tables 19 relate to the print jobs being performed, and thus it is undesirable to delete them. In this case, the CPU as the job managing unit 15c does not process the new print job (step S19). In step S19, the CPU 15 as the job managing unit 15c does not transmit the device acquisition response to the device acquisition request to the print server 11 that is the requestor of the print job, or operates as the information notifying unit 15h to transmit a notice representing processing impossibility.

In the case of the printing status information table on the print job being interrupted is present (Yes in step S18), the empty space enough to newly register the printing status information table 19 to the printing status information storage unit 16 is not present, and the printing status information table 19 of the print job being interrupted is present. In this case, the CPU 15 operates as the printing status information managing unit 15d and checks whether or not the interrupted print job in which a time elapsed after interrupted exceeded a time limit is present (step S20). The time elapsed after interrupted can be calculated based on an interruption start time included in the printing status information table 19 and a present time. The time limit is previously set to, for example, 10 minutes for all of the print servers 11 as illustrated in FIG. 9. The setting value is stored in the magnetic disk device 12d or the non-volatile memory device such as the NV-RAM 12g.

When the time elapsed after the print job has been irrupted is short, since a possibility that communication disconnection between the print server 11 as the requestor of the print job and the printer 12 will be restored is high, it is undesirable to stop management of the print job. That is, when it is judged in step S20 that the interrupted print job in which a time elapsed after interrupted exceeded a time limit is not present (No in step S20), there is no empty space enough to newly register the printing status information table 19 to the printing status information storage unit 16, and the printing status information table 19 relates to the print job being performed or the print job that does not reach the time limit in the interruption state. Therefore, it is undesirable to delete the printing status information table 19. Even in this case, the CPU 15 as the job managing unit 15c does not receive the new print job (step S19).

When it is judged in step S20 that the interrupted print job in which a time elapsed after interrupted exceeded a time limit is present (Yes in step S20), the CPU 15 as the printing status information managing unit 15d selects the printing status information table 19 (the printing status information) to be deleted (step S21). In step S21, when only one print job in which the time limit elapsing after interrupted exceeded the time limit is present, the printing status information table 19 related to the print job is selected as the deletion target. When the plurality of print jobs in which the time limit elapsing after interrupted exceeded the time limit is present, the CPU 15 as the printing status information managing unit 15d checks the rank of the print server 11 that is the requestor of the print job and selects the printing status information table 19 related to the print job of the print server 11 having the lowest rank as the deletion target. When there is the plurality of printing status information tables 19 related to the print job of the print server 11 having the lowest rank, the printing status information table 19 which is earlier in a reception time of the print job is selected as the deletion target.

Next, in step S15, the CPU 15 as the printing status information managing unit 15d deletes the printing status information table 19 selected as the deletion target in step S21 from the printing status information storage unit 16. Deletion of the printing status information table 19 means that management of the print job related to the printing status information table 19 is finished. Through step S15, the empty space for newly registering the printing status information table 19 is formed in the printing status information storage unit 16. Thereafter, the process proceeds to step S13.

Step S14 and step S15 described above can be executed regardless of reception of the device acquisition request. Specially, for example, step S14 and step S15 can be executed at a time when the printing status in the printing status information table 19 changes or periodically at a regular interval.

Figures 11, 12:
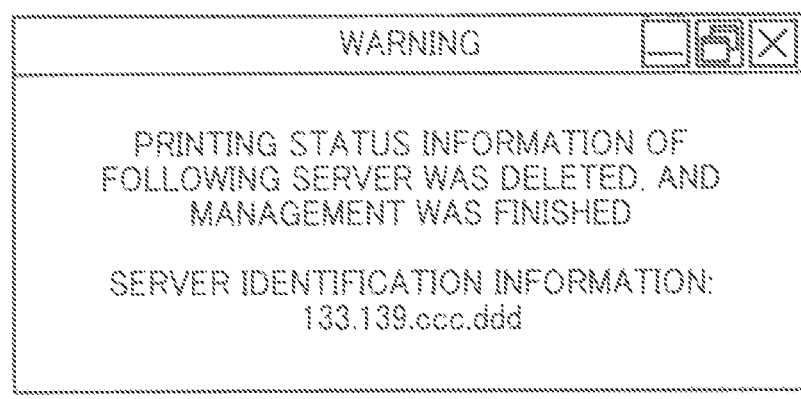
FIG. 11 is a diagram illustrating an example of a deletion notice output on a display of a print server when printing status information is deleted.
FIG. 12 is a diagram illustrating another example of a time limit information table (a server information table).

Further, in step S15, when the printing status information table 19 (the printing status information) is deleted, the CPU 15 can operate as the information notifying unit (the deletion notifying unit) 15h. In this case, the CPU 14 of the print server 11 (see FIG. 3) may control the display control unit 11i based on the received deletion notice and display a warning label on the display device 11n as illustrated in FIG. 11. This can inform the user of the print server 11 of management finish.

As described above, according to the present embodiment, in step S17 and step S21, the printing status information managing unit 15d first selects, from among the plurality of printing status information tables 19 (the printing status information) stored in the printing status information storage unit 16, the printing status information table 19 of the print job requested from the print server 11 having the low rank and deletes the selected printing status information table 19 (step S15). Therefore, it is possible to prevent the printing status information on the print job of the important print server 11 having the high rank from being first deleted. Therefore, according to the present embodiment, it is easier to execute a function of smoothly resuming printing, after printing interruption, on the print job requested from the important print server 11 with the high degree of certainty.

Further, according to the present embodiment, the printing status information managing unit 15d deletes, based on the printing status information, the printing status information table 19 (the printing status information) on the print job whose printing process has been completed. Generally, the necessity of managing the printing status on the print job whose printing process has been completed is low. Therefore, by deleting the printing status information table 19 of the print job whose printing process has been completed as in the present embodiment, the printer 12 can easily receive the new print job, and the print job from the plurality of print servers 11 can be more effectively processed. Further, the storage capacity of the printing status information storage unit 16 can be further reduced.

According to the present embodiment, the printing status information managing unit 15d deletes the printing status information tables 19 of the print jobs from the plurality of print servers 11 having the same rank in an order in which the printing status information table 19 is newly created. Typically, since the process is performed in an order in which the printing status information table 19 is newly created, the earlier the printing status information table 19 is newly created, the higher the possibility that management is not needed is. Therefore, by deleting the printing status information table 19 in the newly created order as in the present embodiment, the printer 12 can easily receive the new print job, and the print jobs from the plurality of print servers 11 can be more effectively processed. Further, the storage capacity of the printing status information storage unit 16 can be further reduced.

According to the present embodiment, the printing status information managing unit 15d deletes the printing status information tables 19 of the interrupted print jobs in which the time elapsed after interrupted reached or exceeded the time limit. The longer the elapsed time after the print job is interrupted is, the longer the time period in which the printing status information table 19 of the print job is stored in the printing status information storage unit 16, and thus it becomes difficult to receive the processing request of the new print job as much. Generally, the print job in which the time elapsed after interrupted is long is low in restoration possibility. Therefore, by setting the time limit and deleting the printing status information table 19 of the print job that the time elapsed after interrupted reached or exceeded the time limit as in the present exemplary embodiment, the printer 12 can easily receive the new print job, and the print jobs from the plurality of print servers 11 can be more effectively processed. Further, the storage capacity of the printing status information storage unit 16 can be further reduced.

According to the present embodiment, disposed is the information notifying unit 15h as the deletion notifying unit for notifying deletion to the print server 11 that is the requestor of the print job of the deleted printing status information table 19 when the printing status information managing unit 15d deletes the printing status information tables 19 (the printing status information) stored in the printing status information storage unit 16. The print server 11 that received the notice can recognize that management of the printing status by the printer 12 was finished and easily take more appropriate action, for example, request the printer 12 to transmit the print job from the first page or notify the printer 12 of the number of pages completed before interrupted in order to resume the print job after interrupted.

Modification

According to the above-described embodiment, in step S17 or step S21, when only one printing status information table 19 as the deletion candidate (a selection candidate) is present, even the printing status information table 19 (the printing status information) on the print job from the print server 11 of the high rank is deleted as long as the set condition is satisfied, for example, the time elapsed after interrupted exceeds the time limit. In order to prevent inexpedience caused by such an operation, the printing status information table 19 of the print job from the print server 11 of the high rank can be maintained in the printing status information storage unit 16 without being deleted.

That is, in step S14, which is illustrated in FIGS. 8 and 10, of selecting the printing status information to be deleted, the printing status information table 19 of the print job from the print server 11 of the high rank may be excluded from the deletion target. Specially, for example, the CPU 15 of the printing status information managing unit 15d may judge "whether or not the interrupted print job is present among the print jobs from the print server 11 of the low rank" in step S18, judge "whether or not the print job in which the time elapsed after interrupted exceeded the time limit is present among the print jobs from the print server 11 of the low rank" in step S20, and execute the process of "selecting the deletion target from among the printing status information tables 19 of the print jobs from the print servers 11 of the low rank" in step S21.

Even though the printing process is interrupted due to the certain cause, the printing status information table 19 of the print job from the print server 11 of the high rank is not deleted but maintained in the printing status information storage unit 16. Therefore, it is possible to execute the function of more smoothly resuming printing, after printing interruption, on the print job requested from the important print server 11 of the high rank with the high degree of certainty.

Further, for example, the CPU 15 as the printing status information managing unit 15d may judge whether or not "the completed print job is present among the print jobs from the print servers 11 of the low rank" in step S16 and execute the process of "selecting the deletion target from among the printing status information tables 19 of the print jobs from the print servers 11 of the low rank" in step S17. Even after the printing process is completed, the printing status information table 19 of the print job from the print server 11 of the high rank is not deleted and but maintained in the printing status information storage unit 16. It is possible to provide the user with a more convenient service, for example, it is possible to respond to a query on a status after the printing process is completed on the print job requested from the important print server 11. In addition, the printing status information table 19 may be set for each of the print servers 11, and the printing status information table 19 of the print server 11 of the high rank may be not deleted but stored. The printing status information table 19 of the new print job from the print server 11 may be rewritten (overwritten) so that the print job can be necessarily received. That is, in order to receive the print job from the important print server 11 of the high rank, the printing status information table 19 (the storage area) for the print server 11 is secured.

If the printing status information table 19 (the printing status information) of the print job from the print server 11 of the high rank is excluded from the deletion target as in the present modification, a time period in which the printing status information table 19 is maintained in the printing status information storage unit 16 becomes lengthy. However, if the empty space for newly registering the printing status information table 19 to the printing status information storage unit 16 is not present due to the above cause, the new print job cannot be received. For this reason, according to the present modification, the maximum storage number Mmax (for example, 3) of the printing status information tables 19 to be stored in the printing status information storage unit 16 is set to a value (larger by 1 or more) larger than the number Nmax (the number of certain host apparatuses, for example, 2) of the print servers 11 of a certain rank in which the printing status information table 19 is maintained without being deleted. Specially, the printing status information managing unit 15d acquires and maintains the number of the printing status information tables 19 of a certain rank (a rank 1 in the present exemplary embodiment), and when an input operation for changing rank setting is performed by the printer 12, the PC 13, or the print server 11, it is desirable not to accept setting change if the number of the printing status information tables 19 of the corresponding rank is larger than a predetermined number (Nmax). As a result, at least one area for storing the printing status information table 19 of the deletion target can be secured in the printing status information storage unit 16, and the situation in that the print job is not accepted at all can be avoided. In this case, the information notifying unit 15h may transmit a rejection notice to a device that is a requestor of the setting change to display and output the fact that the rank setting change is rejected.

As described above, according to the present modification, the printing status information managing unit 15d does not delete but maintain the printing status information table 19 (the printing status information) of the print job from the certain print server 11. Therefore, it is possible to execute the function of more smoothly resuming printing, after printing interruption, of the print job requested from the important print server 11 set to the high rank with the high degree of certainty.

Further, according to the present modification, the maximum storage number Mmax of the printing status information tables 19 to be stored in the printing status information storage unit 16 is set to a value larger than the number Nmax of the certain print servers 11 in which the printing status information table 19 is maintained without being deleted. Therefore, at least one area for storing the printing status information table 19 of the deletion target can be secured in the printing status information storage unit 16, and the situation in that the print job is not accepted at all can be avoided.

The embodiments of the present invention have been described above, but the present invention is not limited to the above-described exemplary embodiments, and various modifications can be made. For example, the number of the print servers or the number of the printing status information tables that can be stored in the printing status information storage unit can be appropriately changed. Two or more ranks may be set. The printing status information may include a time at which the printing status information is created and a time elapsed from a creation time may be included instead of an order in which the printing status information is created. Further, instead of an interruption start time, a time elapsed after an interruption started may be included.

Further, as illustrated in FIG. 12, the time limit may be set for each of the print servers. In this case, the degree of difficulty of deletion of the printing status information, that is, the rank (importance) of the print server can be specified by the length of the time limit. That is, when the print job is interrupted, the printing status information on the print server in which the set time limit is long is difficult to be deleted, and the printing status information on the print server in which the set time limit is short is easy to be deleted. Therefore, using the time limit can obtain the same effects as setting the rank.

According to the present invention, since printing status information on a print job of a host apparatus of a low rank is first deleted, when printing status information on a new print job is newly created, it is possible to prevent printing status information on the print job of the host apparatus of a high rank from being deleted. Therefore, according to the present invention, it is possible to execute a function of smoothly resuming printing, after printing interruption, of the print job requested from an important host apparatus with the high degree of certainty.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing system that comprises a plurality of host apparatuses and a printing apparatus that are connected via an electric communication line, the printing apparatus executing a printing process for a print job that includes printing data transmitted from the host apparatuses and a processing instruction, the printing system comprising:

a printing status information storage unit configured to store therein printing status information and host apparatus identification information so as to be associated with each other, wherein the printing status information includes a printing status representing whether or not a printing processing of the print job in the printing apparatus is interrupted, and the host apparatus identification information represents the host apparatus as a requestor of the print job;

a printing status information update unit configured to update the printing status information stored in the printing status information storage unit based on a monitoring result of the printing apparatus;

a job managing unit configured to judge whether to execute the print job in the printing apparatus according to the printing status information when receiving a processing request of the print job from the host apparatus; and a printing status information managing unit configured to decide printing status information to be stored in the printing status information storage unit, wherein the printing status information managing unit is further configured to first delete, from the printing status information storage unit, printing status information on a print job transmitted from a low-ranked host apparatus that is previously set, wherein the printing status information managing unit deletes printing status information on a print job whose printing process is completed, on the basis of the printing status information, and wherein when deleting printing status information on print jobs transmitted from the plurality of host apparatuses having a same rank, the printing status information managing unit deletes the printing status information in a newly created order.

2. The printing system according to claim 1, wherein the printing status information managing unit does not delete but maintain the printing status information on a print job transmitted from a certain host apparatus.

3. The printing system according to claim 2, wherein maximum number of pieces of the printing status information to be stored in the printing status information storage unit is set to a value larger than number of the certain host apparatuses whose printing status information is maintained without being deleted.

4. The printing system according to claim 1, wherein the printing status information managing unit deletes printing status information on a print job whose printing process is being interrupted when elapsed time from the interruption reaches or exceeds a time limit.

5. The printing system according to claim 4, wherein the time limit is set for each of the host apparatuses.

6. The printing system according to claim 1, further comprising a deletion notifying unit that notifies the host apparatus as the requestor of the print job of the deleted printing status information if the printing status information managing unit deletes the printing status information stored in the printing status information storage unit.

7. A printing apparatus included in the printing system according to claim 1, comprising:

the printing status information storage unit;
the printing status information update unit;
the job managing unit;
the printing status information managing unit; and
a printing unit that executes the print job.

8. A printing method performed in a printing system including a plurality of host apparatuses and a printing apparatus that are connected via an electric communication line, the printing apparatus executing a printing process for a print job that includes printing data transmitted from the host apparatuses and a processing information, the printing method comprising:

storing, in a storage unit, printing status information and host apparatus identification information so as to be associated with each other, wherein the printing status information includes a printing status representing whether or not a printing processing of the print job in the printing apparatus is interrupted, and the host apparatus identification information represents the host apparatus as a requestor of the print job;

updating the printing status information stored in the storage unit based on a monitoring result of the printing apparatus;

judging whether to execute the print job in the printing apparatus according to the printing status information when receiving a processing request of the print job from the host apparatus;

deciding printing status information to be stored in the storage unit; and deleting first, from the storage unit, printing status information on a print job transmitted from a low-ranked host apparatus that is previously set, wherein, in the deleting, printing status information on a print job whose printing process is completed is deleted on the basis of the printing status information, and wherein, in the deleting, when deleting printing status information on print lobs transmitted from the plurality of host apparatuses having a same rank, the printing status information is deleted in a newly created order.

9. The printing method according to claim 8, wherein, in the judging, the printing status information on a print job transmitted from a certain host apparatus is not deleted but maintained.

10. The printing method according to claim 9, wherein maximum number of pieces of the printing status information to be stored in the storage unit is set to a value larger than number of the certain host apparatuses whose printing status information is maintained without being deleted.

11. The printing method according to claim 8, wherein, in the deleting, printing status information on a print job whose printing process is being interrupted is deleted when elapsed time from the interruption reaches or exceeds a time limit.

12. The printing method according to claim 11, wherein the time limit is set for each of the host apparatuses.

13. The printing method according to claim 8, further comprising notifying the host apparatus as the requestor of the print job of the deleted printing status information if the printing status information stored in the storage unit is deleted.

14. The method according to claim 8, further comprising executing the print job.

15. A non-transitory computer readable storage medium that stores a computer program for executing a printing process performed in a printing system including a plurality of host apparatuses and a printing apparatus that are connected via an electric communication line, the printing apparatus executing the printing process for a print job that includes printing data transmitted from the host apparatuses and a processing information, the computer program causes a computer to execute:

storing, in a storage unit, printing status information and host apparatus identification information so as to be associated with each other, wherein the printing status information includes a printing status representing whether or not a printing processing of the print job in the printing apparatus is interrupted, and the host apparatus identification information represents the host apparatus as a requestor of the print job;

updating the printing status information stored in the storage unit based on a monitoring result of the printing apparatus;

judging whether to execute the print job in the printing apparatus according to the printing status information when receiving a processing request of the print job from the host apparatus;

deciding printing status information to be stored in the storage unit; and deleting first, from the storage unit, printing status information on a print job transmitted from a low-ranked host apparatus that is previously set, wherein, in the deleting, printing status information on a print job whose printing process is completed is deleted on the basis of the printing status information, and wherein, in the deleting, when deleting printing status information on print jobs transmitted from the plurality of host apparatuses having a same rank, the printing status information is deleted in a newly created order.

* * * * *